US010223770B2

(12) United States Patent
Tajima

(10) Patent No.: US 10,223,770 B2
(45) Date of Patent: Mar. 5, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kaori Tajima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 15/146,265

(22) Filed: May 4, 2016

(65) Prior Publication Data

US 2016/0335745 A1 Nov. 17, 2016

(30) Foreign Application Priority Data

May 11, 2015 (JP) ................. 2015-096920

(51) Int. Cl.
*G06K 9/40* (2006.01)
*G06T 5/00* (2006.01)
*G06K 9/52* (2006.01)
*G06K 9/00* (2006.01)
*G06K 9/46* (2006.01)

(52) U.S. Cl.
CPC ............ *G06T 5/00* (2013.01); *G06K 9/00281* (2013.01); *G06K 9/52* (2013.01); *G06K 2009/4666* (2013.01)

(58) Field of Classification Search
None
See application file for complete search history.

(56) References Cited

U.S. PATENT DOCUMENTS 8,314,971 B2 * 11/2012 Nishiyama ............... H04N 1/54
358/2.1
2003/0085894 A1 * 5/2003 Tatsumi ................ G06T 15/506
345/426

(Continued)

FOREIGN PATENT DOCUMENTS

| JP | 2010-135996 A | 6/2010 |
| JP | 2010135996 A | * 6/2010 |
| JP | 2010135996 A | * 6/2010 |

OTHER PUBLICATIONS

Automatic detection and correction for glossy reflections in Digital photograph, Rong-Chi Chang, IEEE, 978-1-4244-6709-9, 2020, pp. 44-49.*

(Continued)

*Primary Examiner* — Jayesh A Patel
(74) *Attorney, Agent, or Firm* — Cowan, Liebowitz & Latman, P.C.

(57) ABSTRACT

An image processing apparatus includes a setting unit configured to set a virtual light source for a captured image; a brightness correction unit configured to correct brightness of a partial region of an object using the virtual light source set by the setting unit; an attribute detection unit configured to detect an attribute of the partial region; a glossy component generation unit configured to generate a glossy component that is to be applied to the partial region, according to the attribute of the partial region detected by the attribute detection unit; and a glossy appearance correction unit configured to correct a glossy appearance of the partial region using the glossy component generated by the glossy component generation unit.

16 Claims, 11 Drawing Sheets

(56) References Cited

U.S. PATENT DOCUMENTS

| | | | |
|---|---|---|---|
| 2010/0134811 A1* | 6/2010 | Fukasawa | H04N 1/54 358/1.9 |
| 2011/0026824 A1* | 2/2011 | Ishii | G06T 11/001 382/167 |
| 2011/0142363 A1* | 6/2011 | Nojima | G06T 5/20 382/260 |
| 2011/0273620 A1* | 11/2011 | Berkovich | G06T 5/002 348/584 |
| 2011/0292070 A1* | 12/2011 | Hasegawa | H04N 1/6011 345/590 |
| 2012/0014702 A1* | 1/2012 | Takemura | G03G 15/0126 399/46 |
| 2012/0032973 A1* | 2/2012 | Sano | G01J 3/504 345/593 |
| 2013/0070260 A1* | 3/2013 | Tokushima | H04N 1/54 358/1.2 |
| 2013/0215139 A1* | 8/2013 | Xie | G06T 15/50 345/595 |
| 2015/0109303 A1* | 4/2015 | Boyadzhiev | G06T 5/50 345/426 |
| 2015/0279119 A1* | 10/2015 | Kamio | G06T 11/60 345/589 |

OTHER PUBLICATIONS

Method of determining gloss, Richard Hunter, Research paper RP958, Jan. 1937, pp. 19-39.*
Automatic detection and correction for glossy reflections in Digital photograph, Rong-Chi Chang, IEEE, 978-1-4244-6709-9, 2010, pp. 44-49 (Year: 2010).*
Method of determining gloss, Richard Hunter, Research paper RP958, Jan. 1937, pp. 19-39 (Year: 1937).*

* cited by examiner

F I G. 7

| Fdet | ATTRIBUTE |
|---|---|
| 0 | OTHER THAN FACE |
| 1 | CHEEKS |
| 2 | NOSE |
| 3 | PUPILS AND IRISES |
| 4 | EYE WHITES |
| 5 | LIPS |
| 6 | TEETH |
| 7 | HAIR |

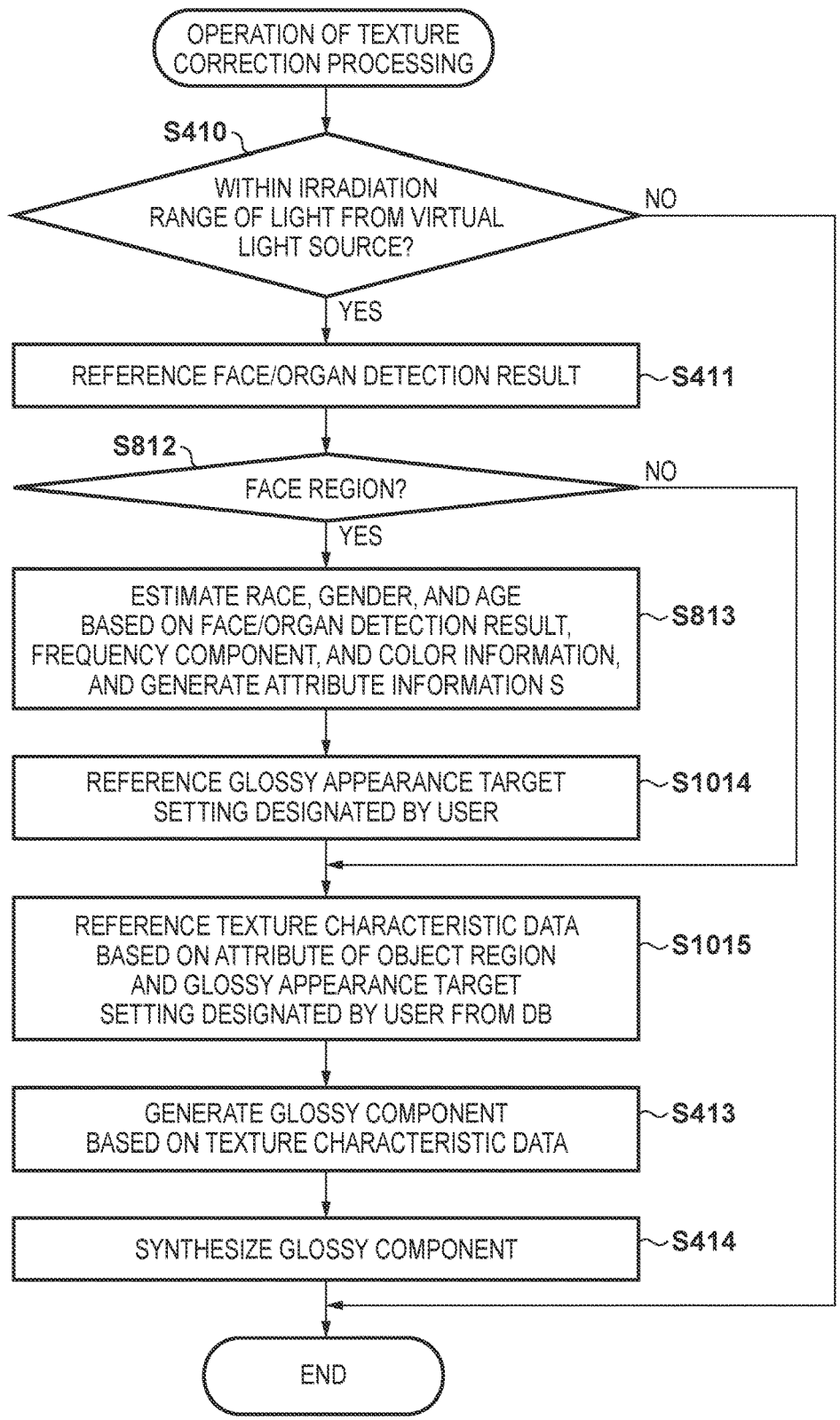

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, particularly to an image processing apparatus that corrects the glossy appearance of an input image.

Description of the Related Art

Conventionally, a technique (relighting) of irradiating an object in an image with light from a virtual light source and thereby correcting the brightness of the object is known (Japanese Patent Laid-Open No. 2010-135996). This technique can brighten a dark region such as a shadow made by ambient light, and can correct an image so that an object present in, for example, a blocked-up shadow can be recognized.

For example, Japanese Patent Laid-Open No. 2010-135996 discloses a lighting technique in which a captured image is subjected to pseudo-lighting processing. Specifically, a region that has a luminance lower than the average luminance of an entire face region is extracted as a shadow region. Then, the luminosity of the extracted shadow region is increased. Accordingly, it is possible to suppress the shadow of the object.

However, although the technique described in Japanese Patent Laid-Open No. 2010-135996 can adjust the image quality of a region that corresponds to shade or shadow with relighting by irradiating the region with light from a virtual light source, it is not possible to adjust the glossy appearance caused by the relighting.

SUMMARY OF THE INVENTION

The present invention was made in view of the above-described problem, and enables, when correcting the brightness of an object in an image by irradiating it with light from a virtual light source, adjustment of the glossy appearance according to the object.

According to a first aspect of the present invention, there is provided an image processing apparatus comprising: a setting unit configured to set a virtual light source for a captured image; a brightness correction unit configured to correct brightness of a partial region of an object using the virtual light source set by the setting unit; an attribute detection unit configured to detect an attribute of the partial region; a glossy component generation unit configured to generate a glossy component that is to be applied to the partial region, according to the attribute of the partial region detected by the attribute detection unit; and a glossy appearance correction unit configured to correct a glossy appearance of the partial region using the glossy component generated by the glossy component generation unit.

According to a second aspect of the present invention, there is provided an image processing method comprising: setting a virtual light source for a captured image; correcting brightness of a partial region of an object using the virtual light source set in the setting; detecting an attribute of the partial region; generating a glossy component that is to be applied to the partial region, according to the attribute of the partial region detected in the attribute detecting; and correcting a glossy appearance of the partial region using the glossy component generated in the glossy component generating.

Further features of the present invention will become apparent from the following description of exemplary embodiments with reference to the attached drawings.

BRIEF DESCRIPTION OF THE DRAWINGS

FIG. 7 is a diagram illustrating an example of correspondence between face/organ detection results and object attributes.

FIG. 11 is a flowchart illustrating an operation of glossy appearance correction processing of the third embodiment.

DESCRIPTION OF THE EMBODIMENTS

Hereinafter, exemplary embodiments of the present invention will be described in detail with reference to the accompanying drawing. Note that the embodiments below will describe an example in which an image processing apparatus according to the present invention is applied to a digital camera. Note that "digital camera" refers to an electronic device that has a function of capturing an image using a photoelectric conversion element, and encompasses a suitable electronic device such as a mobile phone, a game console, or a personal computer that has or uses a camera. Furthermore, the present invention does not necessarily have the image capturing function, and the image processing apparatus according to the present invention is applicable to any electronic device that is capable of image processing.

First Embodiment

Figure 1:
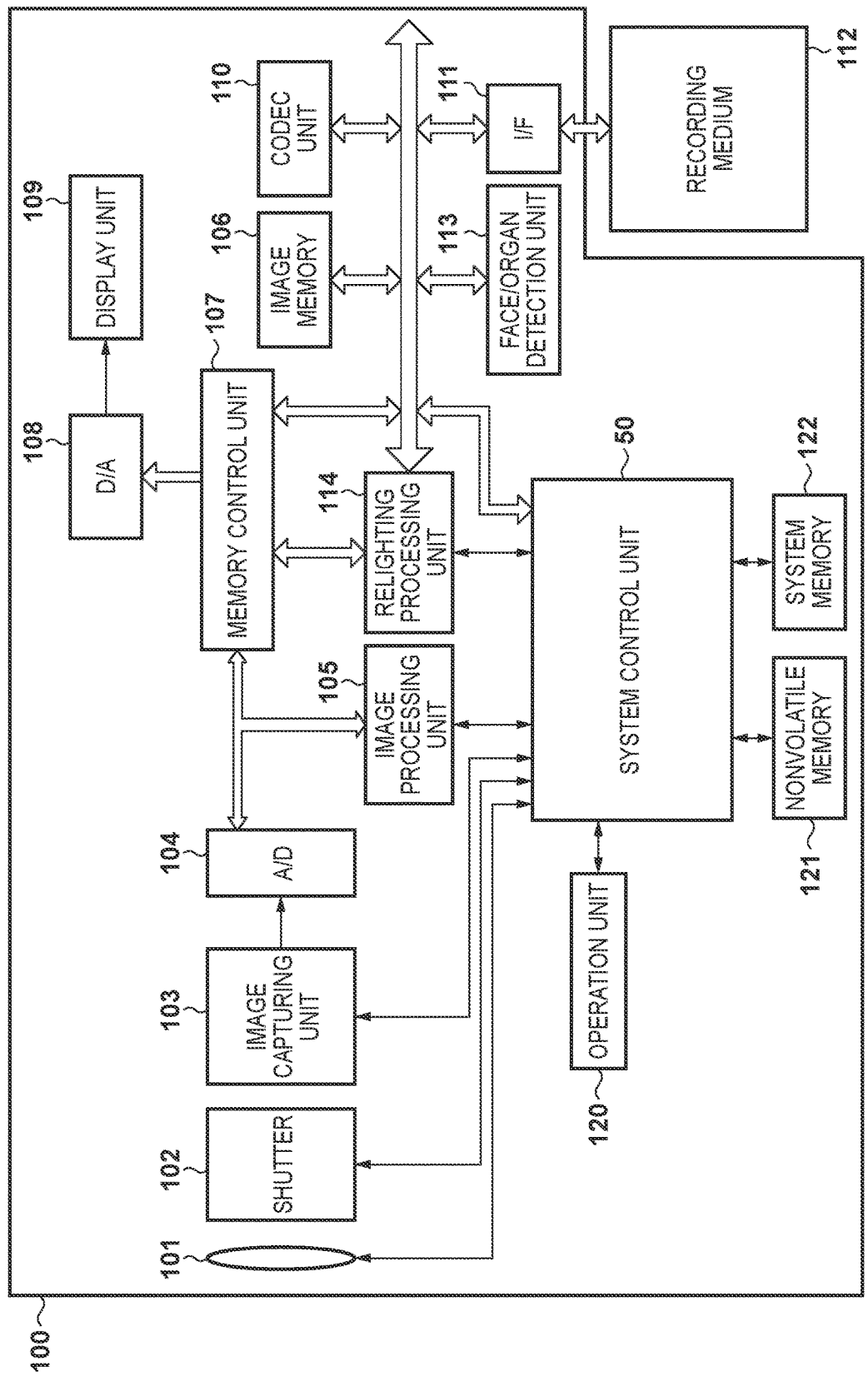
FIG. 1 is a block diagram illustrating a configuration of a digital camera according to a first embodiment of the present invention.

FIG. 1 is a block diagram illustrating an example of a configuration of a digital camera 100 according to a first embodiment of the present invention.

In FIG. 1, a lens group 101 is a zoom lens including a focus lens. A shutter 102 having the diaphragm function is provided between the lens group 101 and an image capturing unit 103. The image capturing unit 103 includes an image sensor represented by a CCD/CMOS image sensor, which converts an optical image formed on an image capturing surface by the lens group 101 into electrical signals for respective pixels. An A/D converter 104 converts the analog signals output by the image capturing unit 103 into digital signals (image data).

An image processing unit 105 subjects the image data output from the A/D converter 104 to various types of image processing such as color interpolation (demosaicing), white balance adjustment, y correction, contour enhancement, noise reduction, and color correction. An image memory 106 temporarily stores the image data. A memory control unit 107 controls reading and writing from and to the image memory 106. A D/A converter 108 converts the image data into analog signals. A display unit 109 includes a display device such as a LCD or an organic EL display, and displays various types of GUIs, a live view image, an image that is read from a recording medium 112 and is reproduced, and the like. A codec unit 110 encodes the image data stored in the image memory 106 by a predetermined method so as to record that data in the recording medium, or decodes encoded image data included in an image file for the purpose of, for example, display.

An interface (I/F) 111 mechanically and electrically connects the detachable recording medium 112 such as, for example, a semiconductor memory card or a card-type hard disk to the digital camera 100. A system control unit 50 may be, for example, a programmable processor such as a CPU or MPU. The system control unit 50 executes programs stored in, for example, a nonvolatile memory 121 or a built-in nonvolatile memory and controls required blocks and circuits, thereby realizing the functions of the digital camera 100. A face/organ detection unit 113 detects, from a captured image, a region in which a face is captured (face detection), and the positions of organs of the face such as the eyes, nose, mouth, and cheeks. A relighting processing unit 114 irradiates an object in the image with light from a virtual light source, and thereby performs processing for correcting the brightness of the object (relighting processing).

An operation unit 120 is a collection of buttons and switches that are used by a user to input various instructions to the digital camera 100.

The nonvolatile memory 121 may be, for example, an EEPROM, which is electrically erasable and storable, or the like. The nonvolatile memory 121 stores not only various types of setting values and GUI data, but also programs to be executed by the system control unit 50 if the system control unit 50 is an MPU or CPU.

A system memory 122 is used for expansion of constants and variables for operation of the system control unit 50, a program read from the nonvolatile memory 121, and the like.

The following will describe the operation of digital camera 100 at the time of image capturing.

For example, the image capturing unit 103 photoelectrically converts, using the image sensor, an object image that is formed on the image capturing surface by the lens group 101 while the shutter 102 is open, and outputs the photoelectrically converted object image as analog image signals to the A/D converter 104. The A/D converter 104 converts the analog image signals output from the image capturing unit 103 into digital image signals (image data), and outputs the converted digital image signals to the image processing unit 105.

The image processing unit 105 subjects the image data from the A/D converter 104 or image data from the memory control unit 107 to various types of image processing such as color interpolation (demosaicing), Y correction, contour enhancement, noise reduction, and color correction.

Furthermore, the image processing unit 105 performs predetermined evaluation value calculation processing based on a result of detection of a position or region of the face/organ that was obtained by the face/organ detection unit 113 or the captured image data, and the system control unit 50 performs exposure control and distance measurement control based on the obtained evaluation value result. The image processing unit 105 further performs automatic white balance (AWB) adjustment using the captured image data. Accordingly, the digital camera 100 of the present embodiment performs TTL (through-the-lens) type AF (automatic focusing) processing, AE (automatic exposure) processing, and AWB (automatic white balance) processing. Furthermore, the system control unit 50 controls relighting by the relighting processing unit 114 and processing for correcting the glossy appearance in the face, with reference to a result of detection of a position or region of the face/organ that was obtained by the face/organ detection unit 113.

The image data output from the image processing unit 105 is written in the image memory 106 via the memory control unit 107. The image memory 106 stores the image data output from the image capturing unit 103 or image data to be displayed on the display unit 109.

Furthermore, the D/A converter 108 converts data for image display that is stored in the image memory 106 into analog signals, and supplies the converted analog signals to the display unit 109. The display unit 109 performs display corresponding to the analog signals from the D/A converter 108 on the display device such as a LCD.

The codec unit 110 encodes the image data recorded in the image memory 106 based on a standard such as JPEG or MPEG. The system control unit 50 adds a predetermined header or the like to the encoded image data to form an image file, and records the image file in the recording medium 112 via the interface 111.

Note that existing digital cameras ordinarily capture a moving image and continue to display the captured moving image on the display unit 109 in an image capturing standby state, and thus the display unit 109 functions as an electronic viewfinder (EVF). In this case, the shutter 102 is set to be in an open state, and an image is captured at, for example, 30 frames/second using a so-called electronic shutter of the image capturing unit 103.

Also, if a shutter button included in the operation unit 120 is pressed halfway down, the above-described AF or AE control will be performed, and if the shutter button is pressed all the way down, actual image capturing will be performed to capture a still image for storage and the captured still image will be recorded in the recording medium 112. Furthermore, if moving image capturing is instructed using a moving image capturing button, recording of a moving image in the recording medium 112 is started.

In addition to the above-described basic operations, the system control unit 50 executes processing of the present embodiment that will be described later by executing the above-described programs stored in the nonvolatile memory 121. In this context, "programs" refer to programs for executing various flowcharts of the present embodiment that will be described later. In this case, constants and variables for the operation of the system control unit 50, programs read from the nonvolatile memory 121, and the like are expanded on the system memory 122.

Figure 2:
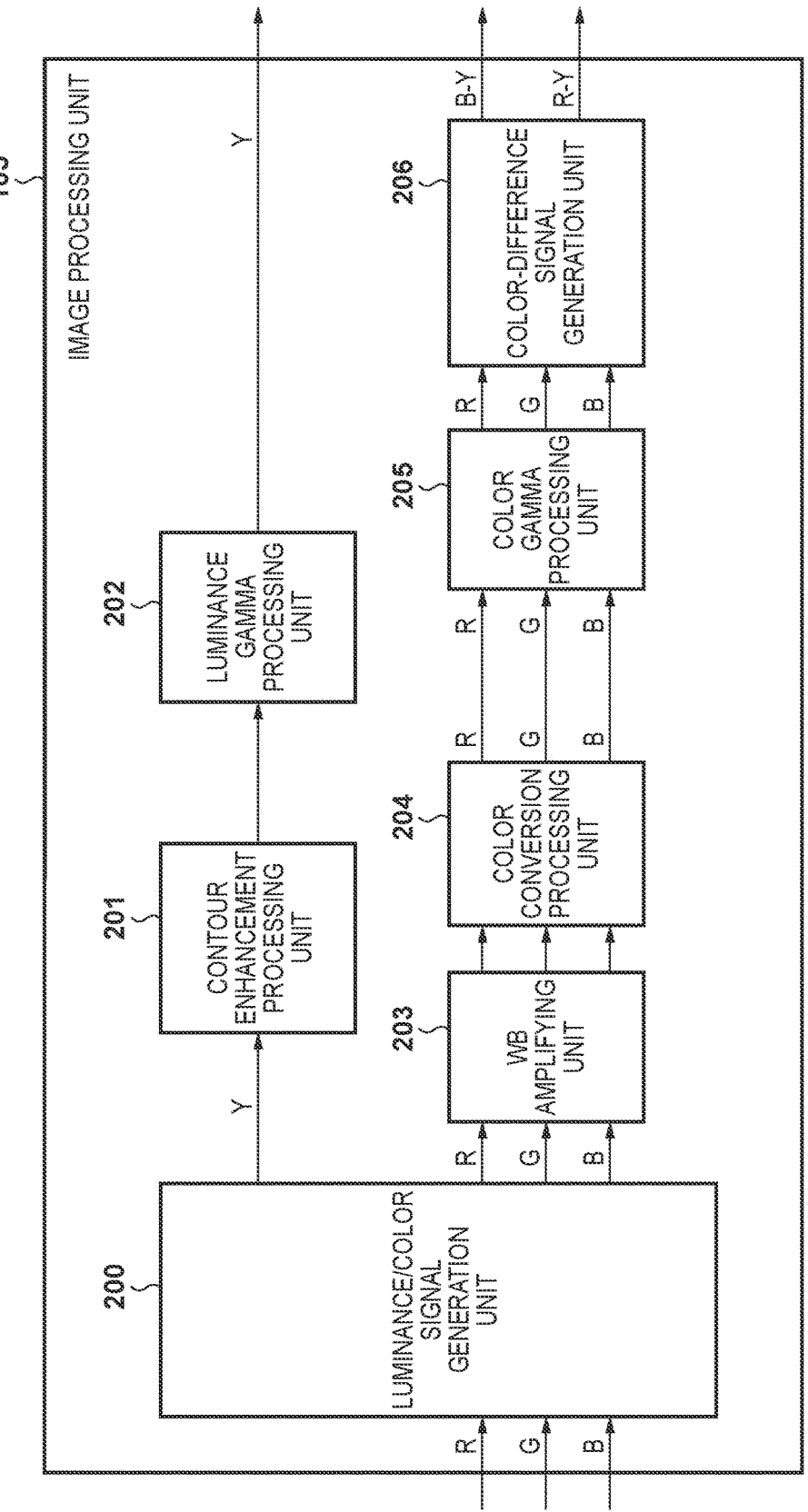
FIG. 2 is a block diagram illustrating a configuration of an image processing unit of the first embodiment.

The following will describe the details of the image processing unit 105 with reference to FIG. 2. FIG. 2 is a block diagram illustrating a configuration of the image processing unit 105.

In FIG. 2, the image processing unit 105 includes a luminance/color signal generation unit 200, a contour enhancement processing unit 201, a luminance gamma processing unit 202, a WB (white balance) amplifying unit 203, a color conversion processing unit 204, a color gamma processing unit 205, and a color-difference signal generation unit 206.

The following will describe processing of the image processing unit 105. Image signals from the A/D converter 104 of FIG. 1 are input to the image processing unit 105. The image signals input to the image processing unit 105 are input to the luminance/color signal generation unit 200. The luminance/color signal generation unit 200 subjects the input RGB image data in a Bayer arrangement to synchronization processing so as to generate color signals R, G, and B. Furthermore, the luminance/color signal generation unit 200 generates a luminance signal Y based on the RGB signals. The luminance/color signal generation unit 200 outputs the generated luminance signal Y to the contour enhancement processing unit 201, and outputs the color signals R, G, and B to the WB amplifying unit 203.

The contour enhancement processing unit 201 performs contour enhancement processing on the luminance signal, and outputs the processed signal to the luminance gamma processing unit 202. The luminance gamma processing unit 202 performs gamma correction on the luminance signal Y, and outputs the luminance signal Y to the image memory 106.

The WB amplifying unit 203 applies a gain to the RGB color signals based on a white balance gain value that is calculated by the system control unit 50 using processing that will be described later, and adjusts the white balance. The color conversion processing unit 204 performs matrix calculation or the like on the RGB signals, and converts the RGB signals so that they have a desired color balance. The color gamma processing unit 205 performs gamma correction on the RGB color signals. The color-difference signal generation unit 206 generates an R-Y signal and a B-Y signal, which are color-difference signals, based on the RGB signals. The Y signal, the R-Y signal, the B-Y signal that are image signals output to the image memory 106 are compressed and encoded by the codec unit 110, and are recorded in the recording medium 112.

Figure 3:
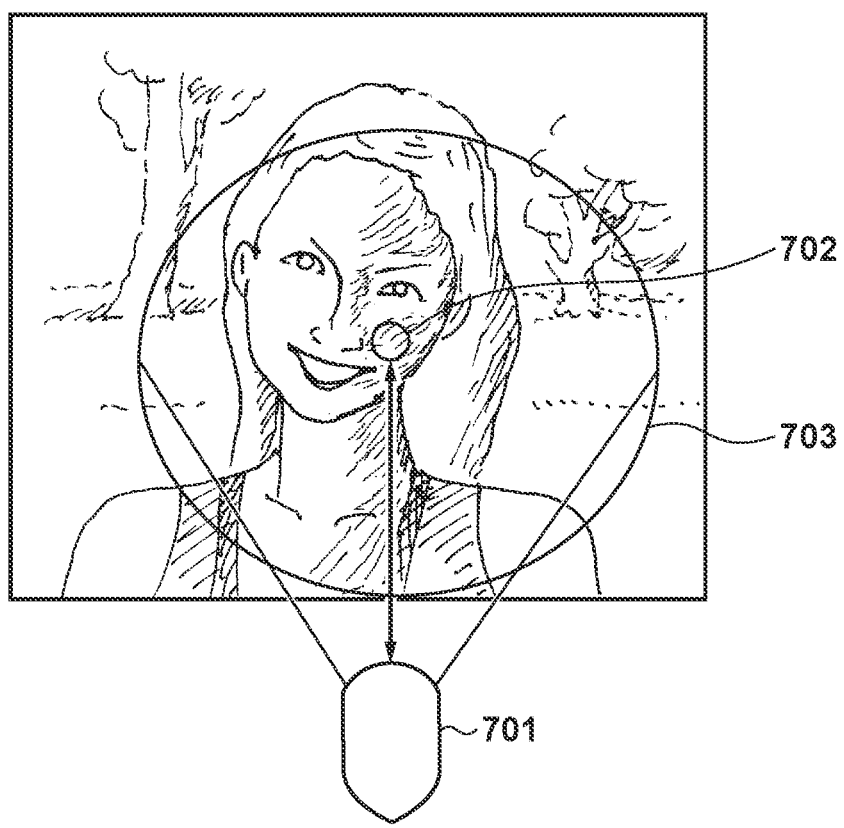
FIG. 3 is a diagram schematically illustrating the relationship between an object and a virtual light source.

The following will describe the preparation operation before the operation of the relighting processing unit 114. In the present embodiment, it is assumed that as an example of the relighting processing, a captured image of a human face as shown in FIG. 3 is irradiated with light from a virtual light source that is set in accordance with an instruction of a user, and the brightness and shade/shadow, as well as the glossy appearance in object regions such as the skin, hair, and pupils are corrected.

Prior to the operation of the relighting processing unit 114, the system control unit 50 calculates control parameters that are to be set for the relighting processing unit 114, and sets the calculated control parameters for the relighting processing unit 114. The operation for setting the parameters at the time of the relighting processing will be described with reference to the flowchart of FIG. 4.

Figure 4:
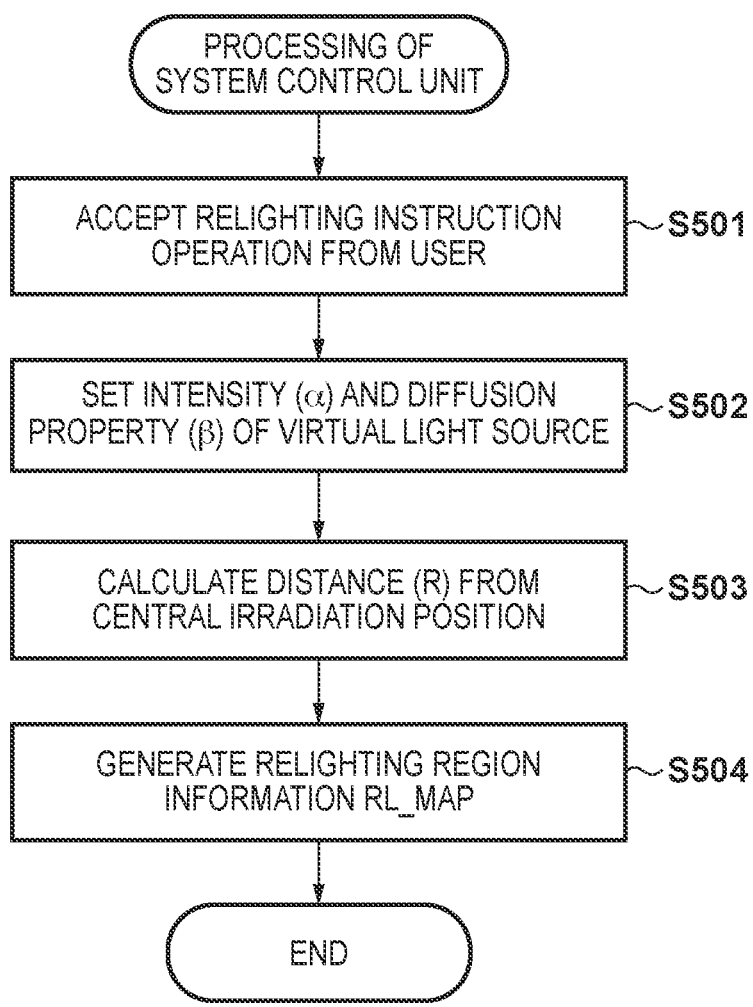
FIG. 4 is a flowchart illustrating relighting parameter setting processing.

In step S501 of FIG. 4, an operation of a user on the operation unit 120 is accepted. Specifically, with an operation of the user on the operation unit 120, the relighting processing is selected from a menu (not shown), and parameters for the relighting processing are input. In the present embodiment, it is assumed that the position of the virtual light source, the intensity ($\alpha$) of the virtual light source, and the diffusion property ($\beta$) of the virtual light source are input by the user as the parameters for the relighting processing. Note that a method by which the user inputs the parameters may be a method by which the user selects parameter values from preset values.

In step S502, the intensity of the light source and the diffusion property of the light source that were input by the user are set for the control parameters of the relighting processing unit.

An example of setting the position of the virtual light source and a central irradiation position are shown in FIG. 3. In FIG. 3, the reference numeral 701 denotes the position of the virtual light source, and the reference numeral 702 denotes the central irradiation position of light from the virtual light source. Furthermore, the reference numeral 703 denotes the irradiation range of light from the virtual light source, and only this range is assumed to be affected by the virtual light source.

In step S503, distances R from the central irradiation position 702 of light from the virtual light source are calculated for respective pixels of the input image, and are stored in the system memory 122 in association with the respective pixel positions. In step S504, for each pixel position of the input image, weight information RL_map indicating how much extent a reflected color component of the virtual light source is to be added (reflection characteristic) is calculated by the formula (1), and is stored in the system memory 122.

$$RL\_map(p) = \alpha \times L \cdot N(P)/D(p)^2 \qquad (1)$$

In Formula (1), $\alpha$ is the intensity of the virtual light source, L is a directional vector of the virtual light source toward the object, N(p) is a normal vector of the object at a pixel position p, and D(p) is a distance between the virtual light source and the object at the pixel position p.

Figure 5:
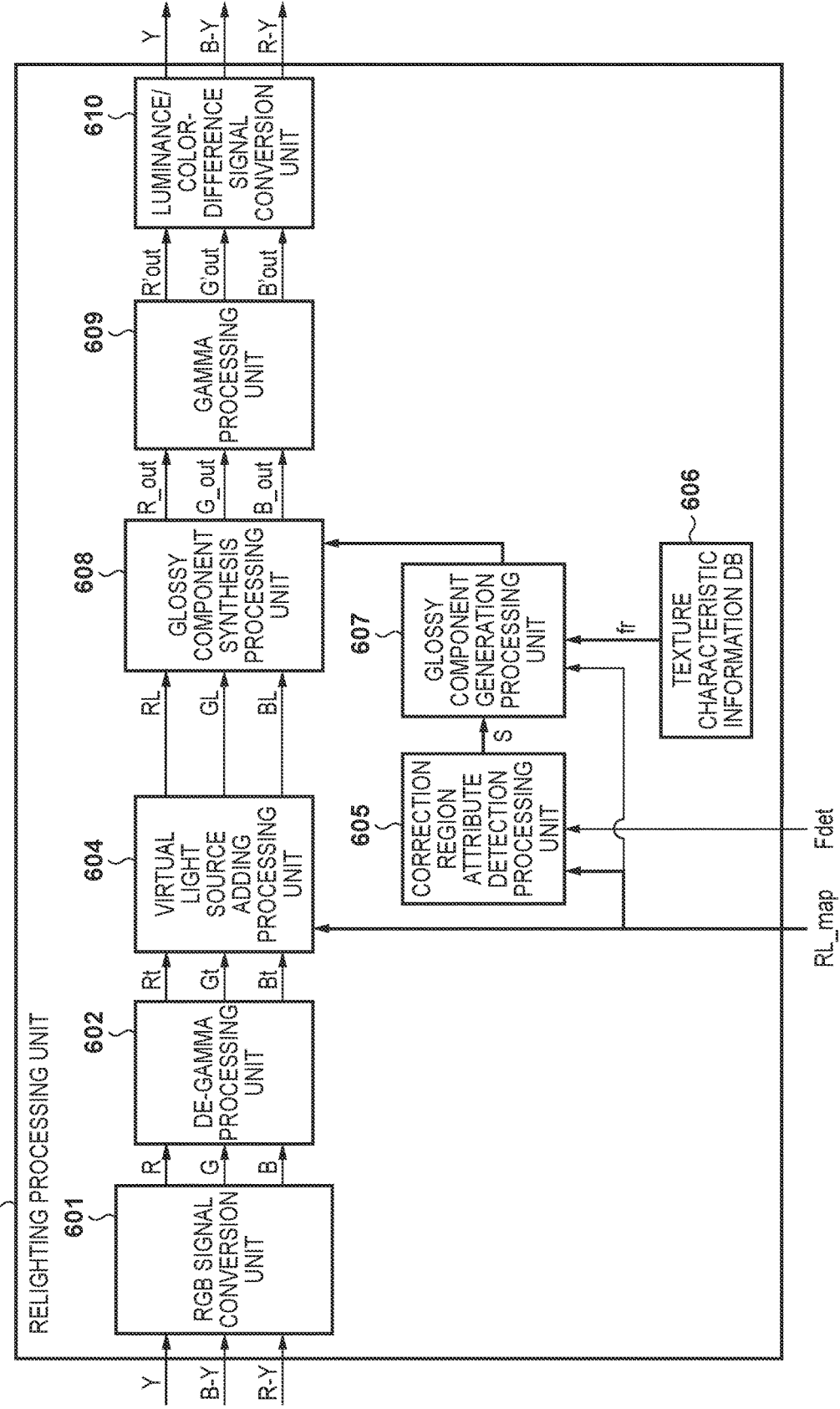
FIG. 5 is a block diagram illustrating a configuration of a relighting processing unit of the first embodiment.

Hereinafter, a configuration of the relighting processing unit 114 will be described. FIG. 5 is a block diagram illustrating a configuration of the relighting processing unit 114.

In FIG. 5, an RGB signal conversion unit 601 converts the input luminance/color-difference signals (Y, B-Y, and R-Y) into RGB signals. A de-gamma processing unit 602 performs de-gamma processing. A virtual light source adding processing unit 604 adds illumination effects (lighting effects) by the virtual light source to the linear RGB signals subjected to the de-gamma processing, with reference to the characteristics and irradiation range of light from the virtual light source, and three-dimensional information of an object image in the irradiation range that are set by the system control unit 50. Adding the lighting effects means adjusting the brightness and the shade/shadow of the object image. A correction region attribute detection processing unit 605 detects the attribute of an object region that is to be irradiated with light from the virtual light source.

Here, if an object is, for example, a human, the attribute of the object region refers to information indicating the type of the region such as hair, cheeks, nose, pupils, or lips that is classified based on the detection result of the face/organ detection unit 113. Furthermore, the attributes are classified in association with the reflection characteristics and scattering characteristics when the object is irradiated with light.

A texture characteristic information DB 606 has stored therein multiple types of texture characteristic information (material appearance characteristic information) that correspond to the attributes of the object regions. A glossy component generation processing unit 607 generates a glossy component, which is to be added by irradiating the object with light from the virtual light source, with reference to the information from the correction region attribute detection processing unit 605 and the texture characteristic information DB 606, and the RL_map from the system control unit 50.

A glossy component synthesis processing unit 608 adds, to the image, the glossy component, which is generated on the object image by irradiating it with light from the virtual light source, with reference to signals output from the virtual light source adding processing unit 604 and the glossy component generation processing unit 607. A gamma processing unit 609 performs gamma transformation on signals output from the glossy component synthesis processing unit 608. A luminance/color-difference signal conversion unit 610 converts the RGB signals into luminance/color-difference signals (Y, B-Y, and R-Y).

Hereinafter, the operation of the relighting processing unit 114 that has the configuration as above will be described. The relighting processing unit 114 reads the luminance/color-difference signals (Y, B-Y, and R-Y) recorded in the image memory 106, and regards them as inputs. The RGB signal conversion unit 601 converts the input luminance/color-difference signals (Y, B-Y, and R-Y) into RGB signals, and outputs the converted RGB signals to the de-gamma processing unit 602. The de-gamma processing unit 602 performs calculation with characteristics inverse to the gamma characteristics applied by the gamma processing unit of the image processing unit 105, and converts the RGB signals into linear data. The linear-transformed RGB signals Rt, Gt, and Bt are input to the virtual light source adding processing unit 604. The virtual light source adding processing unit 604 generates correction signals for adding relighting effects by the virtual light source to the input image, and performs correction processing.

Reflected color components (Rv, Gv, and Bv) of the virtual light source when the image is irradiated with light from the virtual light source are calculated using Formulae (2) to (4), with reference to the linear-transformed RGB signals Rt, Gt, and Bt that are output from the de-gamma processing unit 602, and the RL_map created by the system control unit 50.

$$Rv(p)=RL\_map(p) \cdot f(Rt(p), \beta) \quad (2)$$

$$Gv(p)=RL\_map(p) \cdot f(Gt(p), \beta) \quad (3)$$

$$Bv(p)=RL\_map(p) \cdot f(Bt(p), \beta) \quad (4)$$

In Formulae (2) to (4), f(Rt(p), β), f(Gt(p), β), and f(Bt(p), β), are obtained by smoothing the reflected color components Rt(p), Gt(p), and Bt(p) of the object according to the diffusion property β of the virtual light source.

The estimated reflected color components (Rv, Gv, and Bv) of the virtual light source are added to the linear RGB signals that are output from the de-gamma processing unit 602 as given in Formulae (5) to (7). Accordingly, output RGB values (RL, GL, and BL) of the processing target pixels that are irradiated with light from the virtual light source are generated.

$$RL(p)=Rt(p)+Rv(p) \quad (5)$$

$$GL(p)=Gt(p)+Gv(p) \quad (6)$$

$$BL(p)=Bt(p)+Bv(p) \quad (7)$$

Here, in the virtual light source adding processing of the virtual light source adding processing unit 604, only gain adjustment according to the light distribution characteristics of the virtual light source is performed on the reflected color components Rt(p), Gt(p), and Bt(p) of the object that are obtained from the image at the time of capturing. Accordingly, if the image signals at the time of image capturing do not include a glossy component to be enhanced, it is not possible to generate a new glossy appearance even by irradiating the image with light from the virtual light source.

Therefore, the image processing apparatus of the present embodiment performs, together with relighting, processing for adding and adjusting a glossy appearance of the object surface, with reference to bidirectional reflectance distribution functions. Here, "bidirectional reflectance distribution function" is defined as the ratio of the intensity of incident light in a lighting direction to the intensity of reflected light in an observation direction, and refers to information on which characteristics of the quality of the material of the object surface is reflected. Even if object regions are irradiated with the same light from the virtual light source, the irradiated object regions have different reflection characteristics on the surface and scattering characteristics in the inside depending on the quality of material of the object region, and thus the glossy appearances that are reproduced will be different. For example, a human object, when being irradiated with light, has different glossy appearances between sites such as the head hair, nose, cheeks, eyes, and lips.

Therefore, in the image processing apparatus of the present embodiment, multiple types of bidirectional reflectance distribution functions are stored in advance in the texture characteristic information DB 606. After the attribute of a partial region of the object is recognized by the correction region attribute detection processing unit 605, the glossy component generation processing unit 607 selects an optimal bidirectional reflectance distribution function, and generates a glossy component that is caused by relighting. Then, the glossy component synthesis processing unit 608 performs processing for adding and adjusting an optimal glossy appearance of the partial region of the object that is subjected to the relighting.

Figure 6:
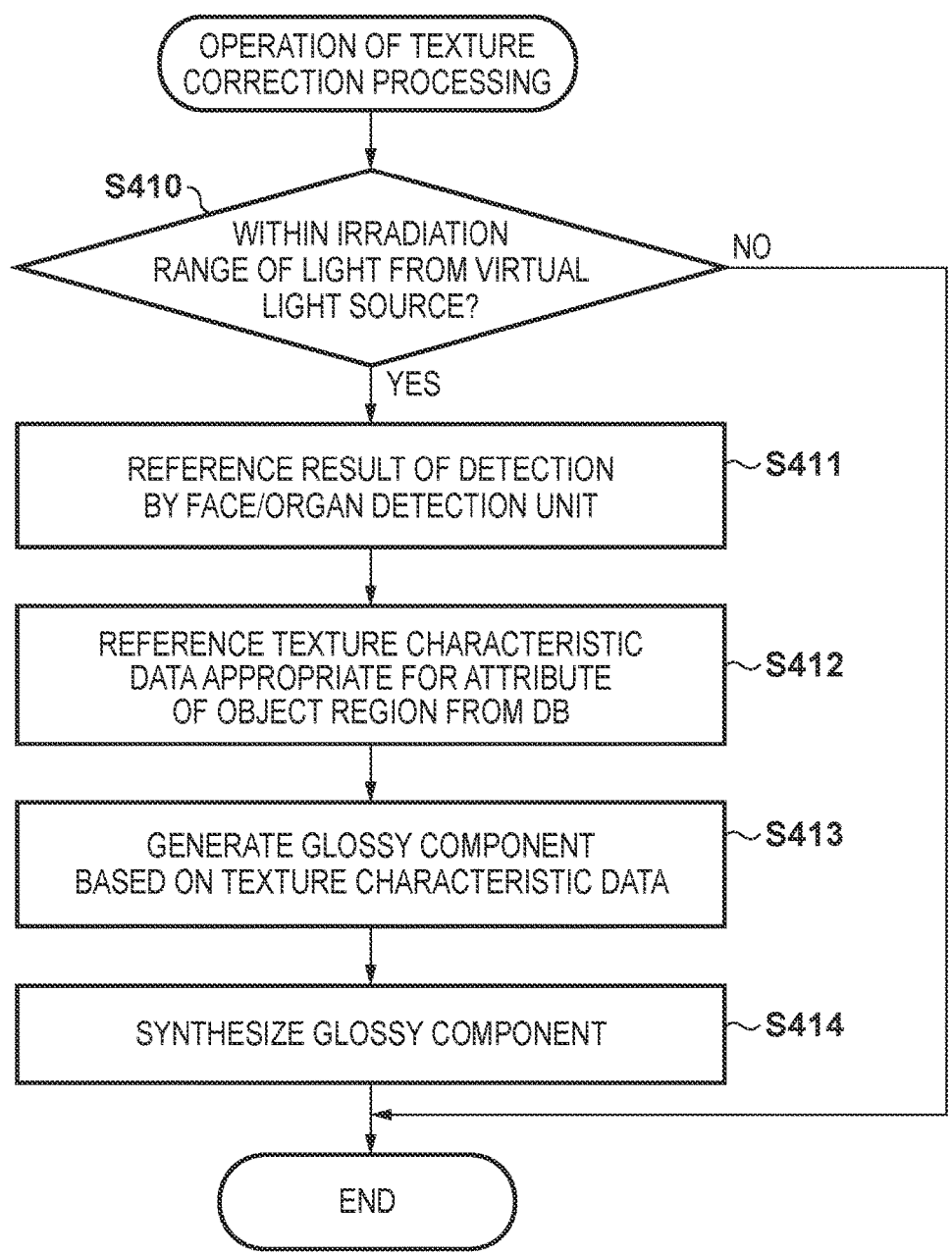
FIG. 6 is a flowchart illustrating an operation of glossy appearance correction processing of the first embodiment.

The following will describe the flow of processing (glossy appearance correction processing) that is performed on a target pixel by the correction region attribute detection processing unit 605 to the glossy component synthesis processing unit 608 with reference to the flowchart of FIG. 6.

In step S410, it is determined whether or not a target pixel is within an irradiation range of light from the virtual light source with reference to the RL_map created by the system control unit 50. If the value of the RL_map at the target pixel is greater than or equal to a predetermined value, the target pixel is deemed to be within the irradiation range of light from the virtual light source, and the procedure advances to step S411. If the value of the RL_map at the target pixel is smaller than the predetermined value, the processing for this target pixel ends.

In step S411, it is determined whether the target pixel belongs to the face, hair, or a specific organ region (nose, eyes, lips, or cheeks) in the face, with reference to a detection result Fdet of the target pixel obtained by the face/organ detection unit 113, and attribute information S is generated. It is assumed that, as shown in FIG. 7, values of the Fdet and attributes of object partial regions are associated in advance with each other.

In step S412, the texture characteristic information of the target pixel that is optimal for the object region is selected from the texture characteristic information DB 606 based on the attribute information S that is output from the correction region attribute detection processing unit 605. Note that it is assumed that the texture characteristic information DB 606 has stored in advance multiple types of texture characteristic information that correspond to the face, hair, and specific organ regions (nose, eyes, lips, and cheeks) in the face. The texture characteristic information is defined with, for example, the bidirectional reflectance distribution function.

In step S413, a glossy component for the target pixel is generated based on the RL_map and the texture characteristic information. In the present embodiment, fr(p, Ω', Ω) is defined as the bidirectional reflectance distribution function, where p(x, y) is the pixel position, Ω' is the direction of light of the virtual light source that is incident on the pixel position p, and Ω is the direction of light that exits from the pixel position p and is input to the camera. Furthermore, the value of the RL_map at the target pixel position is referenced as a level Li(p, Ω') of the light of the virtual light source that is incident on the target pixel. Furthermore, a reflection component Lo(p, Ω) indicating the glossy appearance at the target pixel position is generated by the system control unit 50 referencing the normal vector n of the object at the target pixel position and performing calculation using Formula (7).

$$Lo(p,\Omega) = \int fr(p,\Omega',\Omega) \cdot Li(p,\Omega) \cdot (\Omega' \cdot n) d\Omega' \quad (8)$$

In step S414, the processing for adding and adjusting a glossy appearance of the object surface that is made by relighting is performed by synthesizing the reflected component generated in step S413 with the signals RL(p), GL(p), and BL(p) output by the virtual light source adding processing unit 604.

$$R\_out(p) = RL(p) + Lo(p,\Omega) \quad (9)$$

$$G\_out(p) = GL(p) + Lo(p,\Omega) \quad (10)$$

$$B\_out(p) = BL(p) + Lo(p,\Omega) \quad (11)$$

In the above-described processing, it is possible to analyze characteristics of a captured image, and to generate and synthesize a glossy component based on the attribute of a partial region of an object that is to be irradiated with light from the virtual light source. Accordingly, it is possible to obtain a more excellent image in which not only the brightness and the shade/shadow but also the glossy appearance that is caused when the image is irradiated with light from a virtual light source are adjusted by relighting.

Furthermore, although bidirectional reflectance distribution functions are used as the information indicating texture characteristics in the present embodiment, bidirectional scattering surface reflectance distribution functions may be used. Furthermore, texture information that is generated based on the bidirectional reflectance distribution functions and the bidirectional scattering surface reflectance distribution functions may be stored in advance. Moreover, scattering characteristics within the object and reflection characteristics on an object surface are different depending also on the wavelengths of incident light, and thus texture characteristic data may be defined for each of the R, G, and B signals.

Second Embodiment

Figure 8:
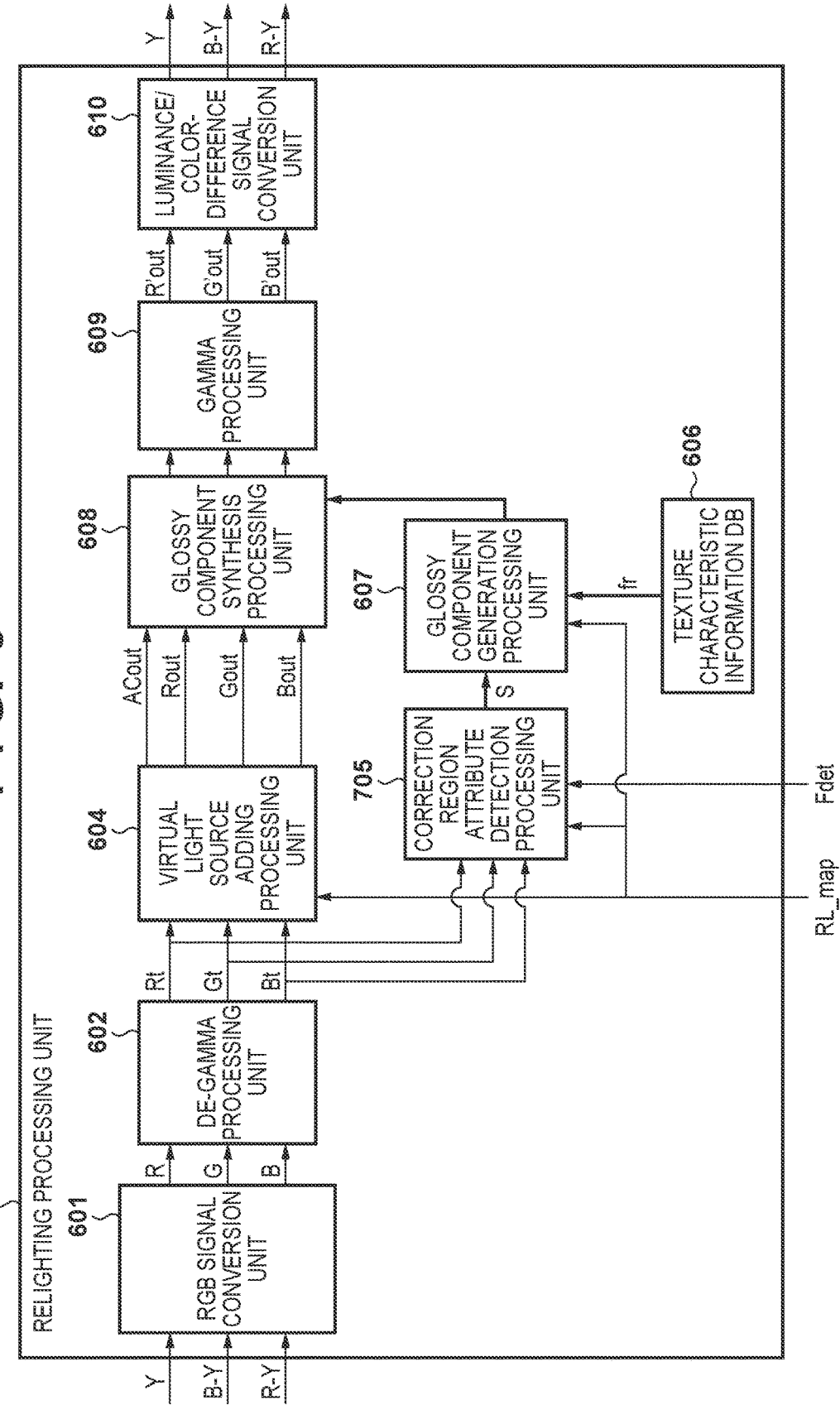
FIG. 8 is a block diagram illustrating a configuration of a relighting processing unit according to a second embodiment.
Figure 9:
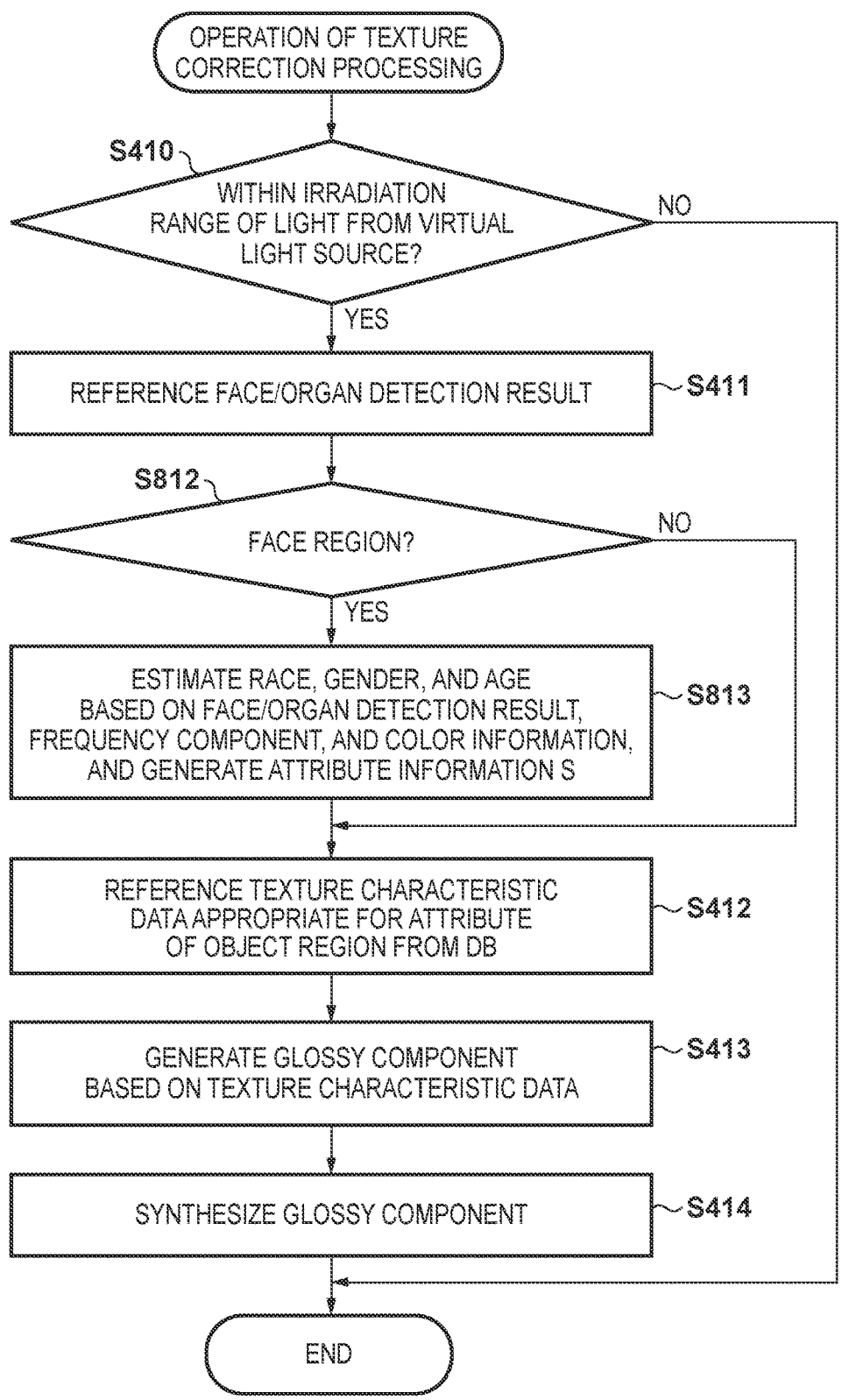
FIG. 9 is a flowchart illustrating an operation of glossy appearance correction processing of the second embodiment.

Hereinafter, a digital camera according to a second embodiment of the present invention will be described with reference to FIGS. 8 and 9. The digital camera of the second embodiment differs from the digital camera of the first embodiment in the operation of a correction region attribute detection processing unit 705 of the relighting processing unit 114. The following will describe only the difference from the first embodiment.

Even in the face region, light scattering and reflection characteristics in the skin or face organs are different between males and females, between adults and children, or between races. Accordingly, in the second embodiment, attributes of partial regions of an object are classified in more detail with reference to not only organ detection results but also results of analyzing frequency components and color information of an image. Then, optimal texture characteristic information is selected, and glossy components of the object regions are adjusted.

The flow of processing that is performed on a target pixel by the correction region attribute detection processing unit 705 to the glossy component synthesis processing unit 608 will be described with reference to the flowchart of FIG. 9.

In step S410, it is determined whether or not a target pixel is within an irradiation range of light from the virtual light source with reference to the RL_map calculated by the system control unit 50. If the value of the RL_map at the target pixel is greater than or equal to a predetermined value, the target pixel is deemed to be within the irradiation range of light from the virtual light source, and the procedure advances to step S411. If the value of the RL_map at the target pixel is smaller than the predetermined value, the processing for this target pixel ends.

In step S411, a detection result Fdet of the target pixel obtained by the face/organ detection unit 113 is referenced. In step S812, it is determined whether or not the target pixel belongs to a face region based on the face/organ detection result Fdet. Since, as shown in FIG. 7, the face/organ detection results Fdet and the attributes of the object regions are associated with each other, if the value of Fdet is other than 0, the procedure advances to step S813, and if the value of Fdet is 0, the procedure advances to step S412.

In step S813, the frequency component and the color information at the target pixel are calculated based on the image signals output from the de-gamma processing unit 602. Also, based on the detection result of the face/organ detection unit 113, the frequency component, and the color information, it is determined whether the target pixel belongs to the face, the hair, a specific organ region (nose, eyes, lips, or cheeks) in the face, and it is furthermore estimated what the race, the gender, and the age are, and attribute information S is created.

In step S412, the texture characteristic data that is appropriate for the attribute of the target pixel is selected from the texture characteristic information DB 606. For example, if the texture characteristic data is selected based on the gender, the texture characteristic data that includes more specular reflection components than that for a female is selected for a male. Furthermore, if the texture characteristic data is selected based on the age, the texture characteristic data that includes more diffuse reflection components is selected for a younger object. The operations of steps S413 and S414 are the same as the first embodiment.

By the above-described processing, the second embodiment also makes it possible to analyze characteristics of a captured image, and to generate and synthesize a glossy component based on the attribute of a partial region of an object that is to be irradiated with light from a virtual light source. Accordingly, it is possible to obtain a more excellent image in which not only the brightness and the shade/shadow but also the glossy appearance that is caused when the image is irradiated with light from a virtual light source are adjusted by relighting.

Third Embodiment

Hereinafter, a digital camera according to a third embodiment of the present invention will be described with reference to FIGS. 10 and 11. The digital camera of the third embodiment differs from the digital cameras of the first and second embodiments in the operations of a glossy component generation processing unit 807 and a glossy component synthesis processing unit 808 of the relighting processing unit 114. The following will describe only the differences from the first and second embodiments.

In the third embodiment, a final image quality target is set based on an instruction from a user, and the glossy component generation processing unit 807 and the glossy component synthesis processing unit 808 are controlled so that the glossy appearance that corresponds to the attribute of the object region and the instruction from the user is obtained.

Figure 10:
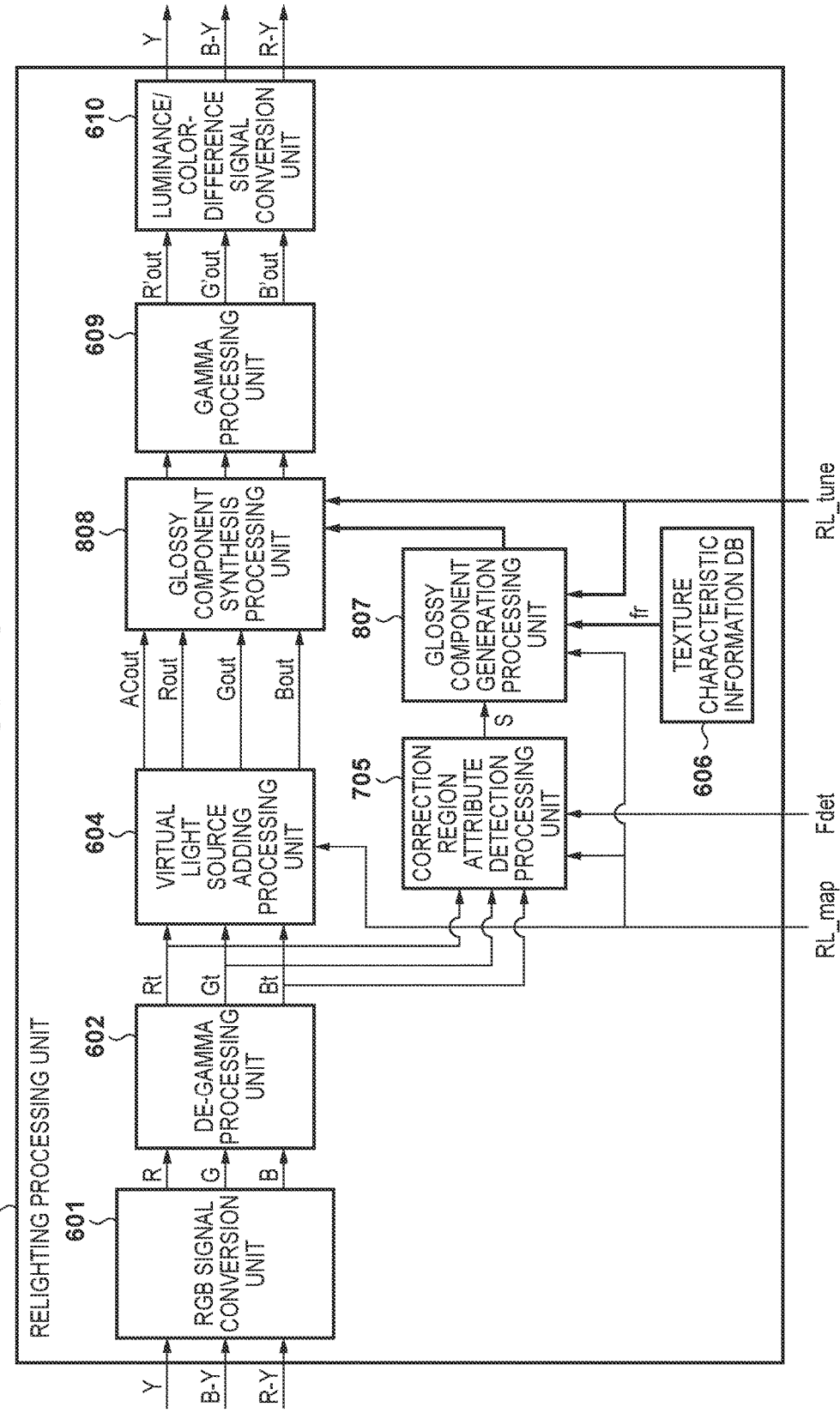
FIG. 10 is a block diagram illustrating a configuration of a relighting processing unit according to a third embodiment.

In FIG. 10, the glossy component generation processing unit 807 generates a glossy component with reference to, in addition to a signal S output from the correction region attribute detection processing unit 705 and the texture characteristic data of the texture characteristic information DB 606, a final relighting setting RL_tune that is input from the system control unit 50. The final relighting setting RL_tune is a parameter for adjusting the degree of the glossy appearance that is to be applied at the time of relighting, and is determined based on an instruction that was made by the user with the operation unit 120.

The flow of processing that is performed on a target pixel by the correction region attribute detection processing unit 705 to the glossy component synthesis processing unit 808 will be described with reference to the flowchart of FIG. 11.

In step S410, it is determined whether or not a target pixel is within an irradiation range of light from a virtual light source with reference to the RL_map calculated by the system control unit 50. If the value of the RL_map at the target pixel is greater than or equal to a predetermined value, the target pixel is deemed to be within the irradiation range of light from the virtual light source, and the procedure advances to step S411. If the value of the RL_map at the target pixel is smaller than the predetermined value, the processing for this target pixel ends.

In step S411, a detection result Fdet of the target pixel obtained by the face/organ detection unit 113 is referenced. In step S812, it is determined whether or not the target pixel belongs to a face region based on the face/organ detection result Fdet. Since, as shown in FIG. 7, the Fdet and the attributes of the object regions are associated with each other, if the value of Fdet is other than 0, the procedure advances to step S813, and if the value of Fdet is 0, the procedure advances to step S412.

In step S813, the frequency component and the color information at the target pixel are calculated based on the image signals output from the de-gamma processing unit 602. Also, based on the detection result of the face/organ detection unit 113, the frequency component, and the color information, it is determined whether or not the target pixel belongs to the face, the hair, a specific organ region (nose, eyes, lips, or cheeks) in the face, and it is furthermore estimated what the race, the gender, and the age are, attribute information S is created, and the procedure advances to step S1014.

In step S1014, the value of RL_tune, which is a final relighting setting parameter, is transmitted to the glossy component generation processing unit 807 from the system control unit 50 in accordance with an instruction that was made by the user with the operation unit 120.

In step S1015, the texture characteristic data is selected from the texture characteristic information DB 606 based on the attribute information S of the object region at the target pixel that is determined in step S813. For example, if the texture characteristic data is selected based on the gender, the texture characteristic data that includes more specular reflection components than that for a female is selected for a male. Furthermore, if the texture characteristic data is selected based on the age, the texture characteristic data that includes more diffuse reflection components is selected for a younger object.

Furthermore, in step S1015, the characteristic of the diffuse reflection components of the texture characteristic data that was selected based on the value of RL_tune instructed by the user is adjusted, and a glossy component that is appropriate for the attribute of the object region and the preference of the user is generated. For example, if the value of RL_tune is small, the texture characteristic data is adjusted so that the value of the diffuse reflection component increases, and a glossy component with suppressed gloss is generated. Furthermore, if the value of RL_tune is large, the texture characteristic data is adjusted so that the value of the diffuse reflection component decreases, and a glossy component with enhanced gloss is generated. The operations of steps S413 and S414 are the same as the first embodiment.

By the above-described processing, the third embodiment makes it possible to analyze characteristics of a captured image, and to generate and synthesize a glossy component based on the attribute of a partial region of an object that is to be irradiated with light from a virtual light source. It is thus possible to adjust the glossy appearance according to the preference of the user. Accordingly, it is possible to obtain a more excellent image in which not only the brightness and the shade/shadow but also the glossy appearance that is caused when the image is irradiated with light from a virtual light source are adjusted by relighting.

Note that in the first to third embodiments, description was given in which a glossy component for a target pixel is generated, but it is also possible that a plurality of glossy component images are generated in advance, and the glossy component image that corresponds to the attribute of a partial region is selected from them to correct the glossy appearance of the partial region.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-096920, filed May 11, 2015 which is hereby incorporated by reference herein in its entirety.

What is claimed is:

1. An image processing apparatus comprising:
   at least one processor; and
   at least one memory storing a program,
   wherein the at least one processor performs the operation of the following units by executing the program stored in the at least one memory:
      a setting unit configured to set a virtual light source for a captured image;
      a brightness correction unit configured to correct brightness of a partial region of an object in the image using the virtual light source set by the setting unit;
      an attribute detection unit configured to detect an attribute of the partial region;
      a glossy component generation unit configured to generate a glossy component that is to be applied to the partial region, according to the attribute of the partial region detected by the attribute detection unit and an irradiation directional vector of the virtual light source set by the setting unit; and
      a glossy appearance correction unit configured to correct a glossy appearance of the partial region using the glossy component generated by the glossy component generation unit.

2. The image processing apparatus according to claim 1, wherein the glossy appearance correction unit corrects the glossy appearance of the partial region by adding the glossy component to a signal of the image.

3. The image processing apparatus according to claim 1, wherein the attribute detection unit detects the attribute of the partial region based on light reflection characteristics on a surface of the object, or light scattering characteristics in the inside of the object.

4. The image processing apparatus according to claim 1, wherein the glossy component generation unit selects, from a plurality of pieces of material appearance characteristic data, a piece of material appearance characteristic data that corresponds to the partial region, and generates the glossy component.

5. The image processing apparatus according to claim 4, wherein the material appearance characteristic data is characteristic data based on a bidirectional reflectance distribution function.

6. The image processing apparatus according to claim 4, wherein the material appearance characteristic data is characteristic data based on a bidirectional scattering surface reflectance distribution function.

7. The image processing apparatus according to claim 1, wherein the glossy component generation unit includes an instruction unit configured to allow a user to give an instruction about the glossy appearance.

8. The image processing apparatus according to claim 1, wherein the attribute detection unit includes a face detection unit configured to detect a face of an object from the image.

9. The image processing apparatus according to claim 8, wherein the face detection unit further detects a specific organ of the face of the object.

10. The image processing apparatus according to claim 1, further comprising:
    an estimation unit configured to estimate reflection characteristics of the partial region of the object,
    wherein the brightness correction unit corrects the brightness of the partial region of the object according to the reflection characteristics estimated by the estimation unit.

11. The image processing apparatus according to claim 1, wherein the glossy component generation unit generates the glossy component that is to be applied to the partial region further according to a normal vector of a surface of the object.

12. The image processing apparatus according to claim 4, wherein the glossy component generation unit selects, from the plurality of pieces of material appearance characteristic data, the piece of material appearance characteristic data that corresponds to the partial region based on the attribute of the partial region detected by the attribute detection unit.

13. An image processing method comprising:
    setting a virtual light source for a captured image;
    correcting brightness of a partial region of an object in the image using the virtual light source set in the setting;
    detecting an attribute of the partial region;
    generating a glossy component that is to be applied to the partial region, according to the attribute of the partial region detected in the attribute detecting and an irradiation directional vector of the virtual light source set in the setting; and
    correcting a glossy appearance of the partial region using the glossy component generated in the glossy component generating.

14. A non-transitory computer readable storage medium storing a program for causing a computer to execute the steps of the image processing method, the image processing method comprising:
    setting a virtual light source for a captured image;
    correcting brightness of a partial region of an object in the image using the virtual light source set in the setting;
    detecting an attribute of the partial region;
    generating a glossy component that is to be applied to the partial region, according to the attribute of the partial region detected in the attribute detecting and an irradiation directional vector of the virtual light source set in the setting; and
    correcting a glossy appearance of the partial region using the glossy component generated in the glossy component generating.

15. An image processing method comprising:
    setting a virtual light source for a captured image;
    correcting brightness of a partial region of an object in the image using the virtual light source set in the setting;
    detecting an attribute of the partial region;
    generating a glossy component that is to be applied to the partial region, according to the attribute of the partial region detected in the attribute detecting and an irradiation directional vector of the virtual light source set in the setting; and
    correcting a glossy appearance the partial region using the glossy component generated in the glossy component generating, wherein in the correcting, a glossy component image that corresponds to the attribute of the partial region is selected from a plurality of glossy component images generated in advance, and the glossy appearance of the partial region is corrected.

16. A non-transitory computer readable storage medium storing a program for causing a computer to execute the steps of the image processing method, the image processing method comprising;

setting a virtual light source for a captured image;

correcting brightness of a partial region of an object in the image using the virtual light source set, in the setting;

detecting an attribute of the partial region;

generating a glossy component that is to be applied to the partial region, according to the attribute of the partial region detected in the attribute detecting and an irradiation directional vector of the virtual light source et in the setting; and correcting a glossy appearance of the partial region using the glossy component generated in the glossy component generating, wherein in the correcting, a glossy component image that corresponds to the attribute of the partial region is selected from a plurality of glossy component images generated in advance, and the glossy appearance of the partial region is corrected.

* * * * *